United States Patent

[11] 3,553,489

[72] Inventors Derek John Spencer;
Eric Paddison, Stafford, England
[21] Appl. No. 691,474
[22] Filed Dec. 18, 1967
[45] Patented Jan. 5, 1971
[73] Assignee The English Electric Company Limited
London, England
a British company
[32] Priority Dec. 16, 1966
[33] Great Britain
[31] No. 56442/66

[54] PHASE SEQUENCE COMPARATOR
6 Claims, 4 Drawing Figs.

[52] U.S. Cl. .......... 307/232, 307/218, 307/291, 307/314, 328/110
[51] Int. Cl. .......... H03k 23/30, H03k 19/22
[50] Field of Search .......... 328/109, 110; 307/232, 218, 238, 314, 291

[56] References Cited

UNITED STATES PATENTS 3,287,495 11/1966 Willard .......... 307/218
3,427,601 2/1969 Korkowski .......... 307/238

FOREIGN PATENTS 1,161,313 8/1962 Germany .......... 328/110

*Primary Examiner*—Donald D. Forrer
*Assistant Examiner*—David M. Carter
*Attorney*—Misegades & Douglas

ABSTRACT: This invention relates to a comparator for sensing the sequence of four input signals A,B,C,D applied thereto in succession. In its basic concept the comparator comprises two bistable devices each having a first input connected in common to receive the signal A from one input stage and the signal D from another input stage. One of the devices has a second input for receiving the signal B and the other device has a second input for receiving the signal C.

With this circuit arrangement a coincident change of state occurs in both of the devices upon the occurrence of the signal D provided that the inputs to the one device are in the sequence A,B,D, and the inputs to the other device are in the sequence ACD. The outputs from these two devices are applied to an AND gate together with the pulse D whereby a coincidence of all three inputs to this gate is indicative of the input signals occurring in the sequence ABCD or ACBD.

PHASE SEQUENCE COMPARATOR

This invention relates to a phase sequence comparator.

From one aspect, the present invention consists in a sequence comparator for sensing the sequence of a plurality of input signals applied thereto in succession, comprising at least two bistable devices each having a first input connected to receive both a first and a second one of said signals, and a second input for receiving a further one of said signals, the further signals applied to the bistable devices being different from one another, and detector means for detecting a coincident change of state in all the devices in response to the said second signals applied thereto.

The input signals may conveniently be pulses derived from different sinusoidal input quantities at predetermined instants in their cycles, for example, at the instants of transition between positive and negative polarity, and the polarity of these pulses may be positive and negative in accord with that possessed by the signal during the following half cycle.

The detector means may comprise an AND gate for receiving at different inputs the outputs from all the bistable devices together with the said second signal, an output being developed from the gate only in response to coincidence between all its input signals, these signals being either all positive in polarity or all negative.

This output from the AND gate may be utilized to effect a protective function. Alternatively, however, the outputs from the comparators may be applied in common to detector means comprising two AND gates, one of which is arranged to produce an output in response to coincident pulses of one polarity and the other being arranged to produce an output in response to coincident pulses of the opposite polarity, the outputs from the two gates themselves being applied to a further AND gate after having been extended for a predetermined period.

This invention is of particular utility in protective relays in sensing the sequence of four vector quantities of the form described in our Pat. No. 1,096,279, i.e. the two vectors which define limiting conditions of operation for the relay (corresponding to the first and second signals referred to above), and two further vectors one of which is dependent on the impedance of the protected system and the other being dependent on both the impedance of the system and a vectorial quantity having a predetermined magnitude and phase angle which may conveniently define a distance boundary for distance protective relays. In such a case, two bistable devices will be employed, the further signal applied to one device being determined by one of the aforesaid further vectors and the further signal applied to the other device being determined by the other vector. As is specified more particularly in the previous application referred to, the occurrence of these two further signals in either order between the two "limiting" signals is indicative of a fault within the system, and appropriate protective action may be taken in response to these conditions.

In order that the invention may be fully understood, some embodiments thereof will now be described with reference to the accompanying drawings in which.

In sensing the sequence of four vectorial quantities four pulses A, B, C and D are initially produced from the sinusoidal signals at the instant of their transition from one polarity to another, i.e. a positive pulse is produced as each signal goes positive and a negative pulse is produced as each signal goes negative. The vectorial quantities represented by pulses A and D will be regarded as the limiting values referred to above and the quantities B and C may appear in either one order or the other between them, and if comparison is to be effected on both the positive pulses and the negative pulses in the same circuit element then these limiting pulses A and D must not be spaced apart by more than 120°. Since the pulses B and C may arrive in either order, then the comparison may be effected separately, i.e. provided that the pulse B appears between pulses A and D in one comparator and that the pulse C appears between pulses A and D in another comparator, then the whole sequence must either by ABCD or ACBD. The initial discussion will therefore be confined to the mode of operation of one comparator for detecting a sequence ABD.

Figure 1:
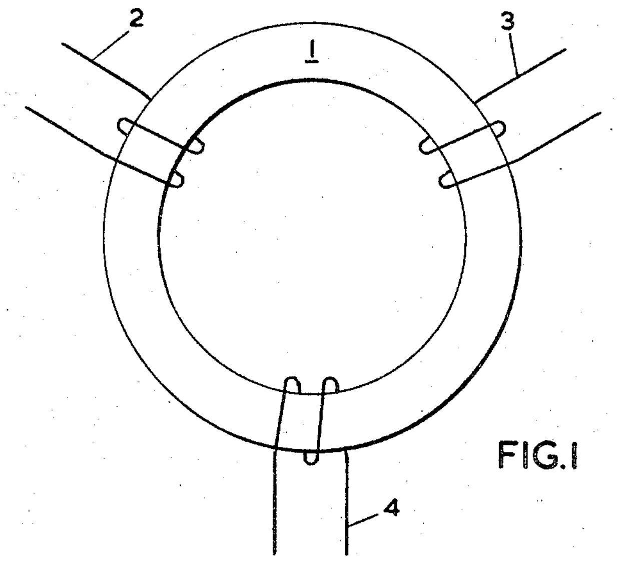
FIG. 1 illustrates a bistable device in the form of a magnetic core having input and output windings employed in a comparator according to this invention.

Referring now to FIG. 1 there is shown a comparator in the form of a magnetic core. More particularly the core is in the form of a ferrite ring 1 upon which are wound two input windings 2 and 3 and an output or "sense" winding 4, the winding 2 being arranged to receive the pulses A and D and the winding 3 being arranged to receive the pulse B. The material of the core possesses a square loop characteristic and assuming that the sequence of the pulses is ABD then the initial positive pulse A on winding 2 will "set" the magnetic state of the core, the following pulse B on winding 3 will "reverse" the state of the core causing a flux change through the output winding 4 thereby producing a pulse of one polarity and the subsequent pulse D on winding 2 will again "reverse" the state of the core causing a pulse of the opposite polarity to be induced in the winding 4. Following this, the negative pulses ABD occur in that sequence so that the state of the core continually changes with the application of each pulse.

Should the sequence now change so that pulses A and D directly follow one another then the sequential changes in the core state will be interrupted and there will be no output pulse produced in response to the D pulse, a change being produced only in response to the B pulse.

The core is thus operative as a bistable device with its operational state changing in synchronism with the application of the input pulses when these are applied in the correct sequence. To this extent then, the comparator may comprise any bistable device, e.g. an Eccles-Jordan-type trigger circuit with the pulses A and D applied to one input and the pulse B applied to the other input.

As mentioned above, an identical comparator is also employed for detecting the sequence of pulses ACD and, provided that the sequences of pulses ABD and ACD are in the correct order there will always be coincident output pulses from the two comparators upon the application of pulse D (as also will be the case for all the pulses A following the initial one).

Figure 2:
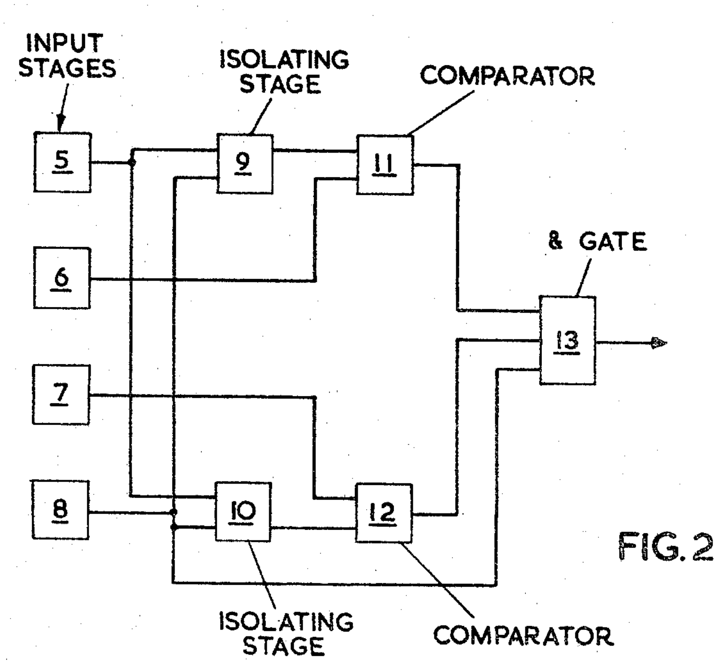
FIG. 2 illustrates a block diagram of a phase sequence comparator according to this invention.

Referring now to FIG. 2, there is shown one form of logical circuit for detecting this coincidence.

This circuit comprises four input stages 5 to 8 for generating pulses A to D, respectively, two isolating stages 9 and 10 for preventing pulses A and D from interacting with their different sources, two comparators 11 and 12 of the type described and an AND gate 13. The comparator 11 receives the pulses A and D from the isolating stage 9 and receives the pulse B from its input stage 6. If the pulses ABD are received in the correct sequence a train of output pulses coincident with the input pulses will be applied to one input of the AND gate 13. Similarly, the comparator 12 receives the pulses A and D from the isolating stage 10 and receives the pulse C from its input stage 7. Again, if the pulses ACD are received in the correct sequence a train of output pulses will be applied to one input of the AND gate. In addition, a D pulse is applied directly from the input stage 8 to another input of this AND gate and accordingly, an output will only be developed by this gate upon coincidence between this D pulse and two coincident output pulses from the comparators 11 and 12. This coincidence of the three pulses will occur only if the pulse B occurs between A and D and if the pulse C occurs between A and D, that is, the sequence of all four pulses is either ABCD or ACBD.

Figure 3:
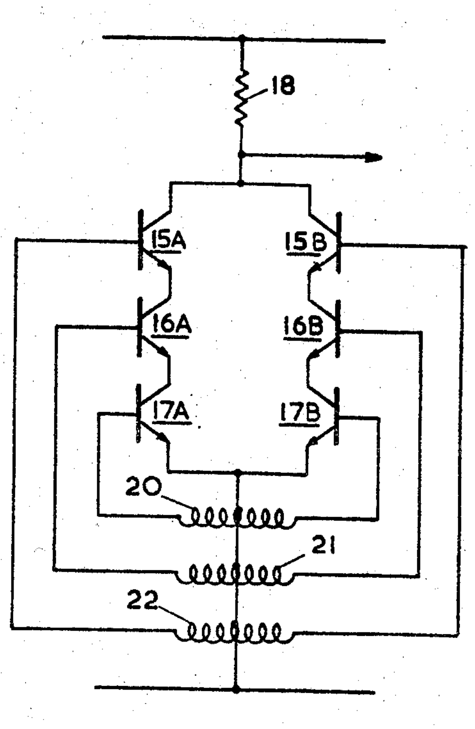
FIG. 3 illustrates a circuit diagram of one form of AND gate employed for detecting coincidence.

The pulses A to D occur with both positive and negative polarity, and the AND gate must accommodate both types of pulse. One form of gate which may be employed for this purpose is shown in FIG. 3.

More particularly, this gate comprises two sets of three series-connected NPN transistors 15A, B; 16A, B; and 17A, B, having a common collector load resistor 18, with the corresponding pairs of transistors having their base electrodes connected between three center tapped windings 20, 21 and 22, respectively. The winding 20 has developed across it the output from the comparator 11, the winding 21 has developed across it the output from the comparator 12 and the winding 22 has developed across it the D gating pulse from the input circuit 8. When the magnetic core illustrated in FIG. 1 is employed in the comparator the windings 20 and 21 may constitute the output winding 3, center tapped.

With this gate circuit, positive going pulses which are coincident with one another will activate one-half of the three windings so as to turn on transistors 15A, 16A and 17A and thus develop an output, and the negative going pulses will activate the other half of the three windings (positively) so as to turn on transistors 15B, 16B and 17B. Thus, an output may be produced in response to either positive going or negative going pulses A to D.

In this way, the operating time required to detect the occurrence of the pulses A to D in either of the two sequence referred to is minimized and although only one polarity of these pulses need be considered for detecting a particular sequence the operating time could be up to twice as long as the previous case. However, with the operation effected in response to pulse of only one polarity, i.e. one-half cycle of the sinusoidal wave, errors due to transient components may be introduced, and in order to avoid this the operation must be dependent on an output being obtained from both positive and negative pulses, i.e. covering a full cycle of the wave, so that transient errors are balanced out.

Figure 4:
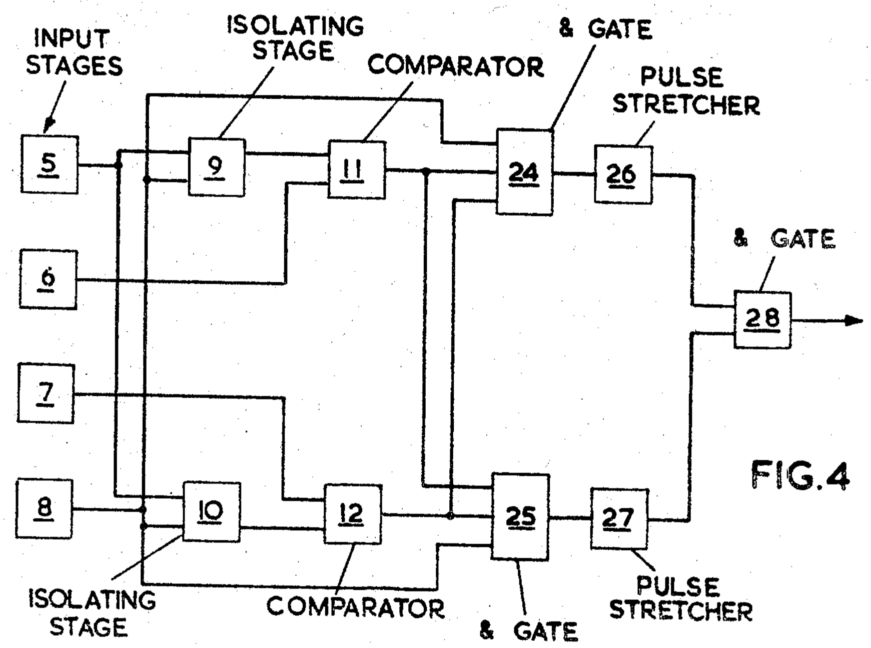
FIG. 4 illustrates a block diagram of another phase sequence comparator according to this invention.

A circuit which responds only to both polarities of pulses being in the particular sequences is shown in FIG. 4 and in this circuit those elements which perform the same function as those referred to in FIG. 2 have been identified by the same reference numerals. In this case, the output from the ABD comparator 11 is applied to both an AND gate 24 and an AND gate 25, and similarly, the output from the ACD comparator 12 is applied to both AND gates, the two AND gates, the two additionally receiving a D pulse input from the input stage 8. The AND gate 24 however is designed to respond only to positive coincidence pulses whereas AND gate 25 responds only to negative coincidence pulses. Thus, assuming that the pulses ABD and ACD are arriving in that sequence, then an output will be produced from the gate 24 upon coincidence of the D pulses in a positive sense and an output will be produced from the gate 25 upon coincidence of these pulses in a negative sense. These output pulses will be spaced apart by half a cycle, and they are then applied through pulse stretching circuits 26 and 27, respectively, before application to a common AND gate 28.

These pulses stretching circuits are arranged to extend the pulse lengths by a period equal to at least half a cycle so as to ensure coincidence at the AND gate 28, and thus an output, in response to either input pulse sequence ABCD or ACBD.

We claim:

1. A circuit for determining whether all of a plurality of phase signals on separate lines appear between two reference signals, comprising a respective bistable circuit for each phase signal which is set to the same state by both the reference signals and to the opposite state by the respective phase signal, and gating means fed from all the bistable devices and with the second reference signal and effective to produce an output only when the second reference signal appears and all the bistable circuits change state together.

2. A circuit according to claim 1, wherein the input signals are in the form of pulses derived from different sinusoidal input quantities at predetermined instants during their cycles, the polarity of the pulses being in accord with the direction of the signal transition at said instants and each bistable circuit being set to one or the other state depending on the polarity of the pulse setting it.

3. A circuit according to claim 2, wherein the gating means comprises two parallel strings of transistors, having collector, base and emitter electrodes, the transistors in each string having series-connected collector-emitter paths, a common load resistor for said transistors, and a plurality of commonly center tapped windings respectively coupled to receive the outputs from the bistable devices and the second reference signal, the base electrodes of corresponding transistors being connected together through these windings.

4. A circuit according to claim 2, wherein the gating means comprises two AND gates, each gate having a plurality of inputs respectively connected to the corresponding outputs from all the bistable devices and a further input for receiving the second reference signal, an output being developed from one of the AND gates in response to coincident pulses of one polarity at all its inputs and an output being developed from the other AND gate in response to coincident pulses of the opposite polarity at all its inputs.

5. A circuit according to claim 4, wherein the two AND gates feed respective pulse stretcher circuits which extend the pulse length over a duration equal to at least the interval between successive reference signals, and a further AND gate fed from the pulse stretcher circuits.

6. A circuit according to claim 5, wherein the bistable devices are magnetic cores.